United States Patent [19]

Lehmann et al.

[11] Patent Number: 4,820,539
[45] Date of Patent: Apr. 11, 1989

[54] METHOD OF MAKING BUTTER

[75] Inventors: Hanno Lehmann; Werner Vennewald, both of Oelde, Fed. Rep. of Germany; Wolfram Hoffmann, Buckland Beach, New Zealand

[73] Assignee: Westfalia Separator AG, Oelde, Fed. Rep. of Germany

[21] Appl. No.: 96,693

[22] Filed: Sep. 14, 1987

[30] Foreign Application Priority Data

Sep. 27, 1986 [DE] Fed. Rep. of Germany ....... 3632898

[51] Int. Cl.$^4$ ............................................. A23C 15/06
[52] U.S. Cl. ..................................... 426/581; 426/40; 426/583; 426/664
[58] Field of Search ................... 426/581, 664, 583, 40

[56] References Cited

U.S. PATENT DOCUMENTS 2,406,819  9/1946  Farrall ................................. 426/664
3,324,551  6/1967  Mnilk et al. ......................... 426/664

FOREIGN PATENT DOCUMENTS 0789095  12/1980  U.S.S.R. ............................. 426/581

Primary Examiner—Donald E. Czaja
Assistant Examiner—Helen Pratt
Attorney, Agent, or Firm—Sprung Horn Kramer & Woods

[57] ABSTRACT

A defined amount of a product containing concentrated non-fat dry substance is supplied in such a way that the content of non-fat dry substance in the butter is adjusted to the maximum permissible level during the buttering process.

18 Claims, 1 Drawing Sheet

METHOD OF MAKING BUTTER

BACKGROUND OF THE INVENTION

The present invention relates to a method of making butter means of a buttering machine with two buttering cylinders, a cutoff press, and a buttermilk collector, whereby cream is processed into butter grain and buttermilk in the first buttering cylinder and the resulting mixture is transferred to the second buttering cylinder, in which the buttermilk is separated out and from which it is transferred to the buttermilk collector, from which a preliminary portion is removed, chilled, and returned to the buttering machine.

A method of this type is known, for example, from U.S. Pat. No. 3,324,551. The known method does not make it possible to essentially affect or even control the level of non-fat dry substance in the butter during the buttering process. Very specific standards exist in relation to the composition of the butter, and must be complied with. These standards concern the maximum levels of water and non-fat dry substance and the minimum level of butterfat. The known method does not ensure the maximum permissible level of non-fat dry substance in the butter or the permissible water content during the buttering process. The deficit must accordingly be made good by the subsequent addition of butterfat, which is the most expensive constituent of butter. Since the butterfat is accompanied by water, the water content will approach the permissible level, and the addition of other materials that also contain water is no longer possible.

SUMMARY OF THE INVENTION

The object of the present invention is to improve the aforesaid method to the extent that the level of non-fat dry substance in the butter can be controlled during the buttering process.

This object is attained in accordance with the invention by means of an improvement wherein a definite amount of a product containing concentrated non-fat dry substance is added to the buttering machine.

Adding the concentrated product to the buttering machine increases the level of non-fat dry substance in the butter in such a way that the desired final content of non-fat dry substance in the butter can be controlled in a simple way by varying the amount of concentration of the concentrated product.

The added product can be concentrated buttermilk, concentrated skim milk, or a concentrated concentrate of egg white and lactose or constituents thereof. The concentrated product can be conveyed to the first buttering cylinder, mixed with the cream before the latter is supplied to the first buttering cylinder, conveyed to the second buttering cylinder, or mixed with the chilled buttermilk and conveyed with it to the second buttering cylinder. The concentrated product can contain at least 10% non-fat dry substance. The product can be concentrated at a ratio of 1 to 3.

The separator can be a membrane-filtration system or a centrifuge.

The product can be concentrated thermally.

Some preferred embodiments of the invention will now be specified with reference to the attached drawing, wherein

DETAILED DESCRIPTION OF THE PREFERRED EMBODIMENTS

Figure 1:
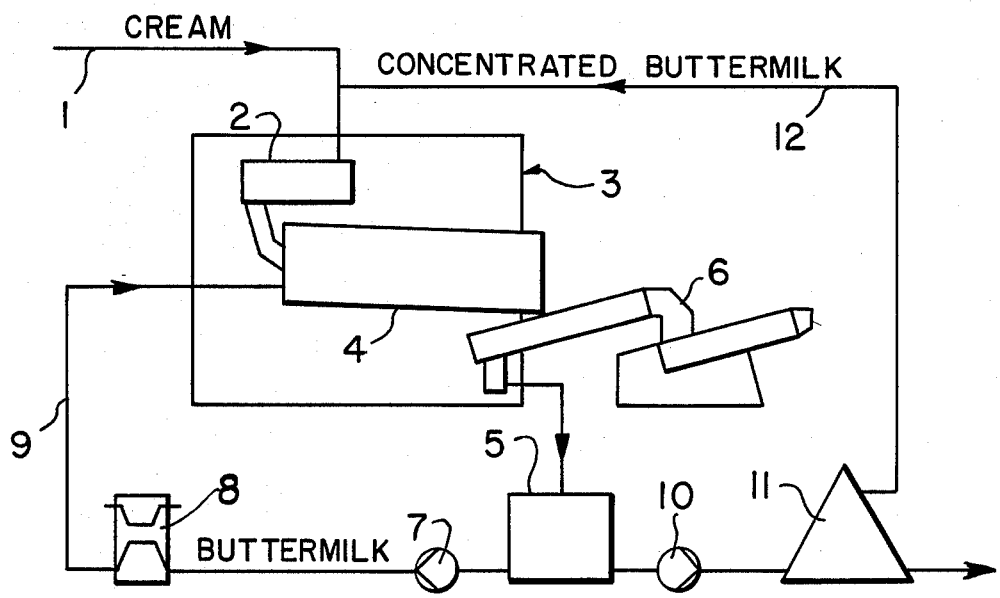
FIG. 1 is a flow chart of a preferred embodiment of the invention wherein concentrated buttermilk is added to the first buttering cylinder and FIG. 2 is a flow chart of another preferred embodiment wherein concentrated buttermilk is added to the second buttering cylinder.

Referring now to FIG. 1, cream flows through a cream line 1 into a buttering cylinder 2 that is a component of a buttering machine 3. The cream is broken down into a mixture of butter grain and buttermilk in cylinder 2 and conveyed to a second buttering cylinder 4. The buttermilk is separated out in cylinder 4 and conveyed to a buttermilk collector 5, whereas the butter corn is conveyed to a cutoff press 6. A portion of buttermilk is conveyed by means of a pump 7 through a cooler 8 and through a buttermilk line 9 to second buttering cylinder 4. Another portion of buttermilk is conveyed by means of a pump 10 to a separator 11 that separates the buttermilk into a concentrated buttermilk with a high level of non-fat dry substance and a buttermilk phase with a a low level of non-fat dry substance. The concentrated buttermilk is conveyed to cream line 1 through a line 12 and mixed well with the cream before the latter is added to first buttering cylinder 2. Separator 11 can be set to affect both the amount and the concentration of concentrated buttermilk.

Figure 2:
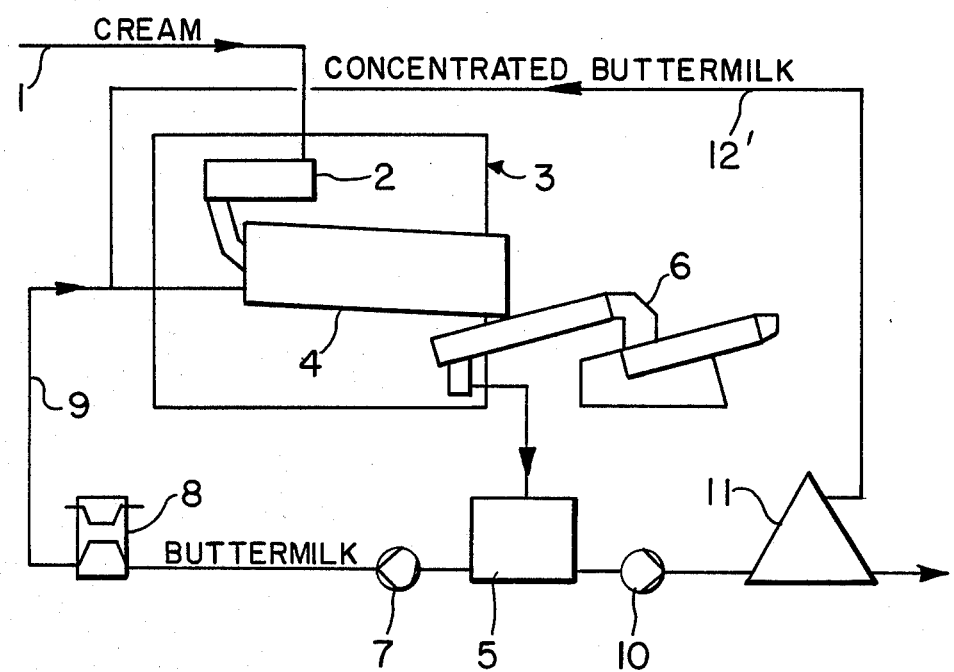

In the embodiment illustrated in FIG. 2 the concentrated buttermilk is conveyed through line 12' to buttermilk line 9 and hence to second buttering cylinder 4.

If denaturated serum proteins are employed as product, they will accumulate on the membrane as the spherules of fat in the cream and will accordingly get into the butter during buttering, increasing its level of non-fat dry matter. When the milk is separated, the fat content of the cream will therefore initially be adjusted higher than is conventional for buttering cream. Adding the denaturated serum proteins will then adjust the buttering cream from its increased fat content to a fat content that is optimal for buttering.

The denaturated serum proteins are obtained from milk products, skim milk for example. In order to denaturate the serum proteins, heated skim milk is concentrated in an ultrafiltration plant and the retentate is subjected to a chronologically defined temperature treatment.

The denaturated serum proteins are deep-frozen and kept in a stacking tank. The denaturated serum proteins are continuously added to the pasteurized and deep-frozen cream before buttering in such a way that cream is adjusted to a fat content that is optimal for buttering.

It will be appreciated that the instant specification and claims are set forth by way of illustration and not limitation, and that various modifications and changes may be made without departing from the spirit and scope of the present invention.

What is claimed is:

1. In a method of making butter with a buttering machine with two buttering cylinders and a buttermilk collector, comprising processing cream into butter grain and buttermilk in a first buttering cylinder of the buttering machine, transferring the resulting mixture to a second buttering cylinder of the buttering machine to separate the buttermilk, transferring the buttermilk to a buttermilk collector, and removing a preliminary portion of the buttermilk from the collector to chill same and returning the chilled buttermilk to the buttering machine, the improvement comprising: adding a predetermined amount of a product containing concentrated non-fat dry substance to the buttering machine by supplying the buttermilk from the collector to a separator to obtain an output of concentrated buttermilk with a high level of non-fat dry substance and an output of concentrated buttermilk with a low level of non-fat dry substance and supplying the output of the separator to the buttering machine.

2. The method as in claim 1, wherein the added product is concentrated buttermilk.

3. The method as in claim 1, wherein the added product is concentrated skim milk.

4. The method as in claim 1, wherein the added product is a concentrated concentrate of protein and lactose or constituents thereof.

5. The method as in claim 1, wherein the added product is added to the first buttering cylinder.

6. The method as in claim 1, wherein the added product is mixed with the cream before the cream is supplied to the first buttering cylinder.

7. The method as in claim 1, wherein the added product is conveyed to the second buttering cylinder.

8. The method as in claim 1, wherein the added product is mixed with the chilled buttermilk and returned with it to the second buttering cylinder.

9. The method as in claim 1, wherein the added product contains at least 10% non-fat dry substance.

10. The method as in claim 1, wherein the added product is concentrated at a ratio of 1 to 3 with respect to the liquid to solid content.

11. The method as in claim 1, wherein the separator is a membrane-filtration system.

12. The method as in claim 1, wherein the separator is a centrifuge.

13. The method as in claim 1, wherein the added product is concentrated thermally.

14. The method as in claim 1, wherein denaturated serum proteins are employed as product.

15. The method as in claim 14, wherein the denaturated serum proteins are obtained from milk products including skim milk.

16. The method as in claim 14, wherein the serum proteins have been denaturated by concentrating heated skim milk in an ultrafiltration plant and subjecting the retenate to a chronologically defined temperature treatment.

17. The method as in claim 16, wherein the denaturated serum proteins are deep-frozen and kept in a stacking tank.

18. The method as in claim 17, wherein the denaturated serum proteins are continuously added to pasteurized and deep-frozen cream before buttering to adjust cream to a fat content that is optimal for buttering.

* * * * *